United States Patent
Kelly

(10) Patent No.: US 10,815,666 B2
(45) Date of Patent: *Oct. 27, 2020

(54) ROOFING COVER BOARD SHINGLES

(71) Applicant: Thomas L. Kelly, Waterbury, CT (US)

(72) Inventor: Thomas L. Kelly, Waterbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,783

(22) Filed: Feb. 20, 2019

(65) Prior Publication Data

US 2019/0257089 A1    Aug. 22, 2019

Related U.S. Application Data

(60) Provisional application No. 62/633,777, filed on Feb. 22, 2018.

(51) Int. Cl.
*E04D 1/26* (2006.01)
*E04D 1/20* (2006.01)
*E04D 1/28* (2006.01)

(52) U.S. Cl.
CPC ............. *E04D 1/26* (2013.01); *E04D 1/20* (2013.01); *B32B 2419/06* (2013.01); *E04D 1/28* (2013.01)

(58) Field of Classification Search
CPC .... E04D 1/26; E04D 1/28; E04D 1/20; B29B 17/00
See application file for complete search history.

(56) References Cited

U.S. PATENT DOCUMENTS

| | | | |
|---|---|---|---|
| 2,191,465 A * | 2/1940 | Ochs | E04D 1/26 52/558 |
| 6,984,670 B2 * | 1/2006 | Meyers, III | B29B 17/0042 521/40 |
| 7,351,462 B2 | 4/2008 | Friedman et al. | |
| 8,707,643 B1 | 4/2014 | Kalkanoglu et al. | |
| 9,032,679 B2 | 5/2015 | Propst | |
| 9,259,860 B2 | 2/2016 | Kalkanoglu et al. | |
| 2006/0096205 A1 * | 5/2006 | Griffin | E04C 2/296 52/309.4 |
| 2009/0000222 A1 * | 1/2009 | Kalkanoglu | E04D 1/20 52/173.3 |
| 2010/0037548 A1 | 2/2010 | Kalkanoglu et al. | |
| 2010/0077689 A1 * | 4/2010 | Kalkanoglu | E04D 1/085 52/555 |
| 2010/0199584 A1 * | 8/2010 | Kalkanoglu | C09J 7/29 52/411 |
| 2012/0117908 A1 * | 5/2012 | Turek | E04D 1/20 52/519 |

(Continued)

FOREIGN PATENT DOCUMENTS

| CA | 2211049 A1 * | 1/1999 | ......... B29B 17/0042 |
|---|---|---|---|
| CA | 2864703 A1 | 3/2015 | |

OTHER PUBLICATIONS

Letter received from Foley & Lardner LLP dated Dec. 17, 2019, 3 pages.

*Primary Examiner* — Beth A Stephan
(74) *Attorney, Agent, or Firm* — Cantor Colburn LLP

(57) ABSTRACT

A building system includes a plurality of shingles mounted adjacent one another relative to a building surface. Each of the plurality of shingles has a core formed from a compressed, shredded composite material, and each of the plurality of shingles includes a first end having a first thickness and a second end having a second thickness.

21 Claims, 6 Drawing Sheets

(56) References Cited

U.S. PATENT DOCUMENTS

| | | | |
|---|---|---|---|
| 2012/0164385 A1* | 6/2012 | Heulings | C08J 3/2053 |
| | | | 428/144 |
| 2013/0199410 A1* | 8/2013 | Maldonado | C08L 95/00 |
| | | | 106/281.1 |
| 2014/0072808 A1* | 3/2014 | Peng | E04D 5/10 |
| | | | 428/422.8 |
| 2015/0047285 A1* | 2/2015 | DeJarnette | E04D 1/20 |
| | | | 52/560 |
| 2016/0168344 A1* | 6/2016 | Jones | C08J 5/045 |
| | | | 523/122 |
| 2017/0284100 A1* | 10/2017 | Jenkins | B32B 5/022 |
| 2018/0265705 A1* | 9/2018 | Eberts | C08K 3/02 |
| 2018/0266111 A1* | 9/2018 | Kelly | B32B 1/00 |
| 2018/0266112 A1* | 9/2018 | Kelly | E04D 3/35 |
| 2019/0119918 A1* | 4/2019 | Kelly | E04D 3/352 |

\* cited by examiner

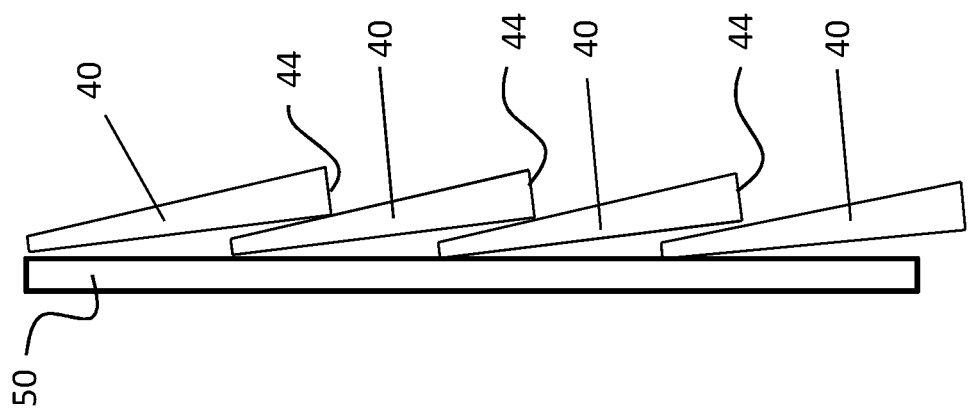
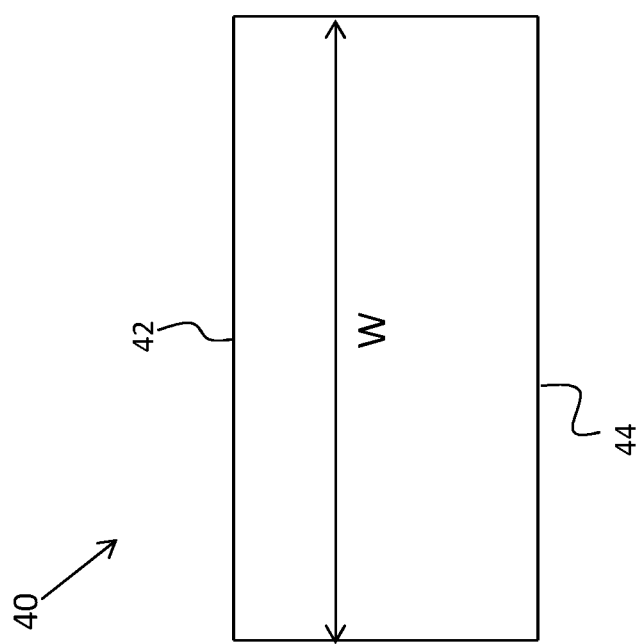
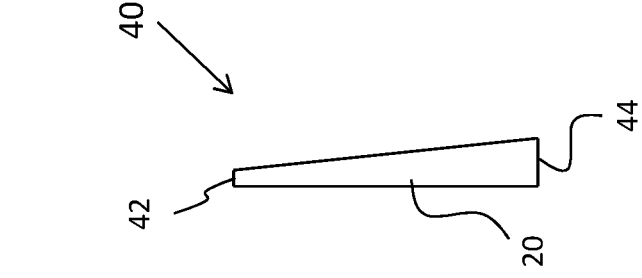
FIG. 3A
FIG. 3B

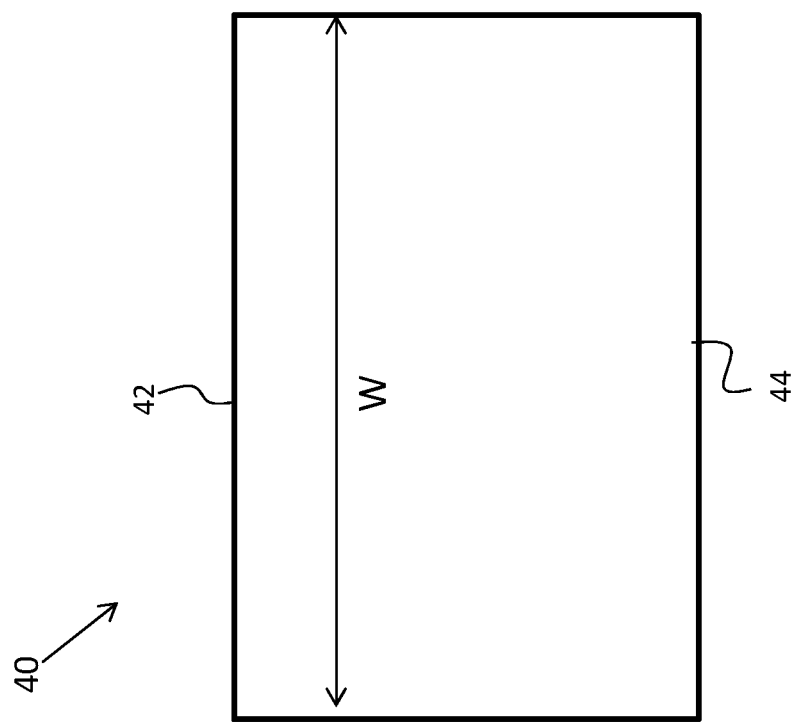
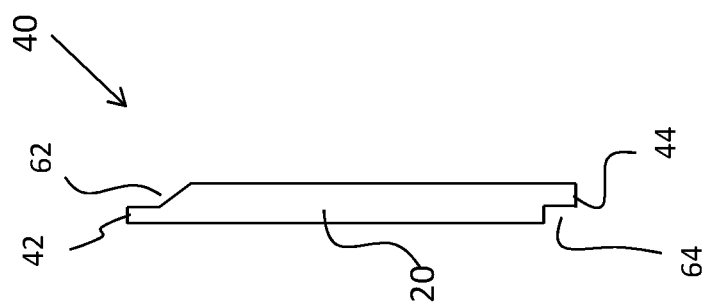

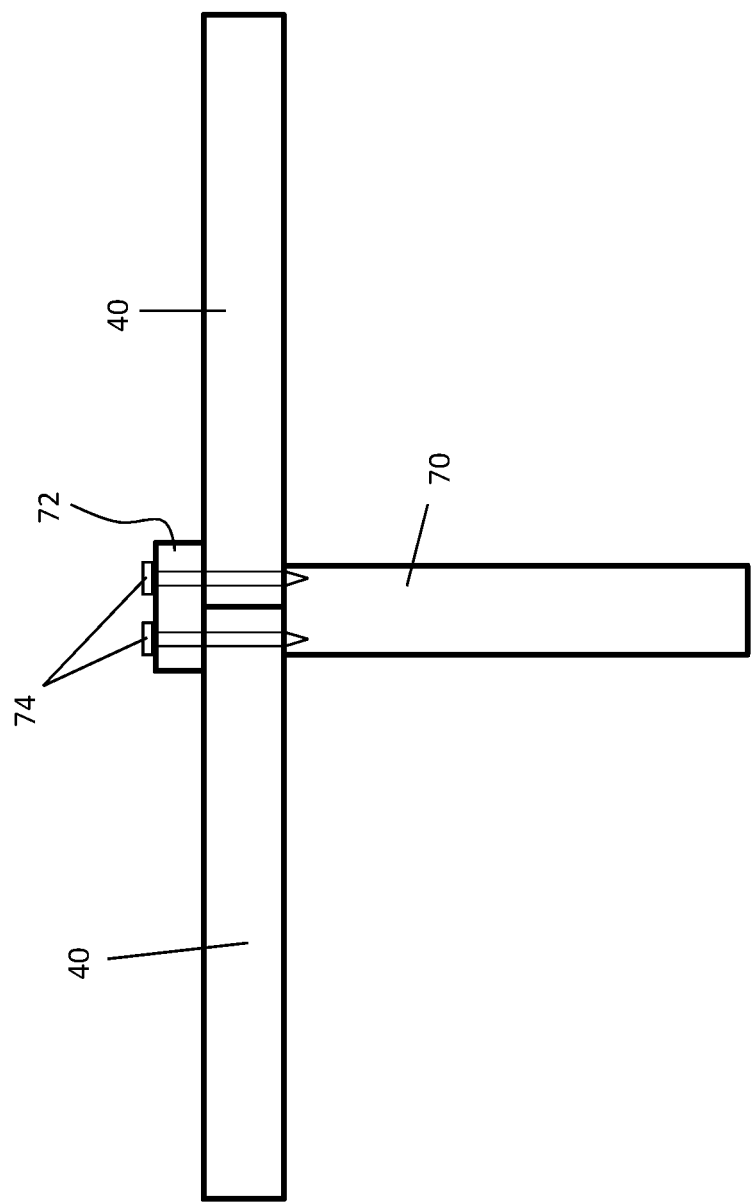

ROOFING COVER BOARD SHINGLES

CROSS-REFERENCE TO RELATED APPLICATIONS

This application claims the benefit of U.S. Provisional Application Ser. No. 62/633,777 filed Feb. 22, 2018, which is incorporated herein by reference in its entirety.

BACKGROUND

Exemplary embodiments of the invention relate to a roofing system, and more particularly, to a cover board for use in a roofing system having a flat or low-slope roof.

Commercial and residential buildings having a flat or low-slope roof deck typically include a roofing system having at least one layer of insulation, a layer of roofing cover boards that overlie the one or more layers of insulation, and a waterproofing membrane that overlies the upper surface of the cover boards. The insulation is susceptible to damage, such as from the weather and other causes commonly encountered in roofing construction. The rigidity of the roofing cover board is intended to protect the more fragile insulation from damage. The waterproofing membrane overlying the cover board layer protects both the cover board and the insulation from moisture and other adverse climatic conditions. Normally, these three components are installed in succession to build the roofing system for a flat or low-slope roof deck.

While these roofing systems function well, there remains a need to provide improved roofing cover boards.

BRIEF SUMMARY OF THE INVENTION

According to one embodiment of the invention, a building system includes a plurality of shingles mounted adjacent one another relative to a building surface. Each of the plurality of shingles has a core formed from a compressed, shredded composite material, and each of the plurality of shingles includes a first end having a first thickness and a second end having a second thickness.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3A includes side and plan views of a tapered shingle according to an embodiment;

FIG. 3B is a side view of a shingle assembly including the shingle of FIG. 3A according to an embodiment.

FIG. 5A includes side and plan views of a shiplap shingle according to an embodiment;

FIG. 5B is a side view of a shingle assembly including the shingle of FIG. 5A according to an embodiment; and FIG. 6 is a side view of a batten-type shingle assembly according to another embodiment.

The detailed description explains embodiments of the invention, together with advantages and features, by way of example with reference to the drawings.

DETAILED DESCRIPTION

Figure 1:
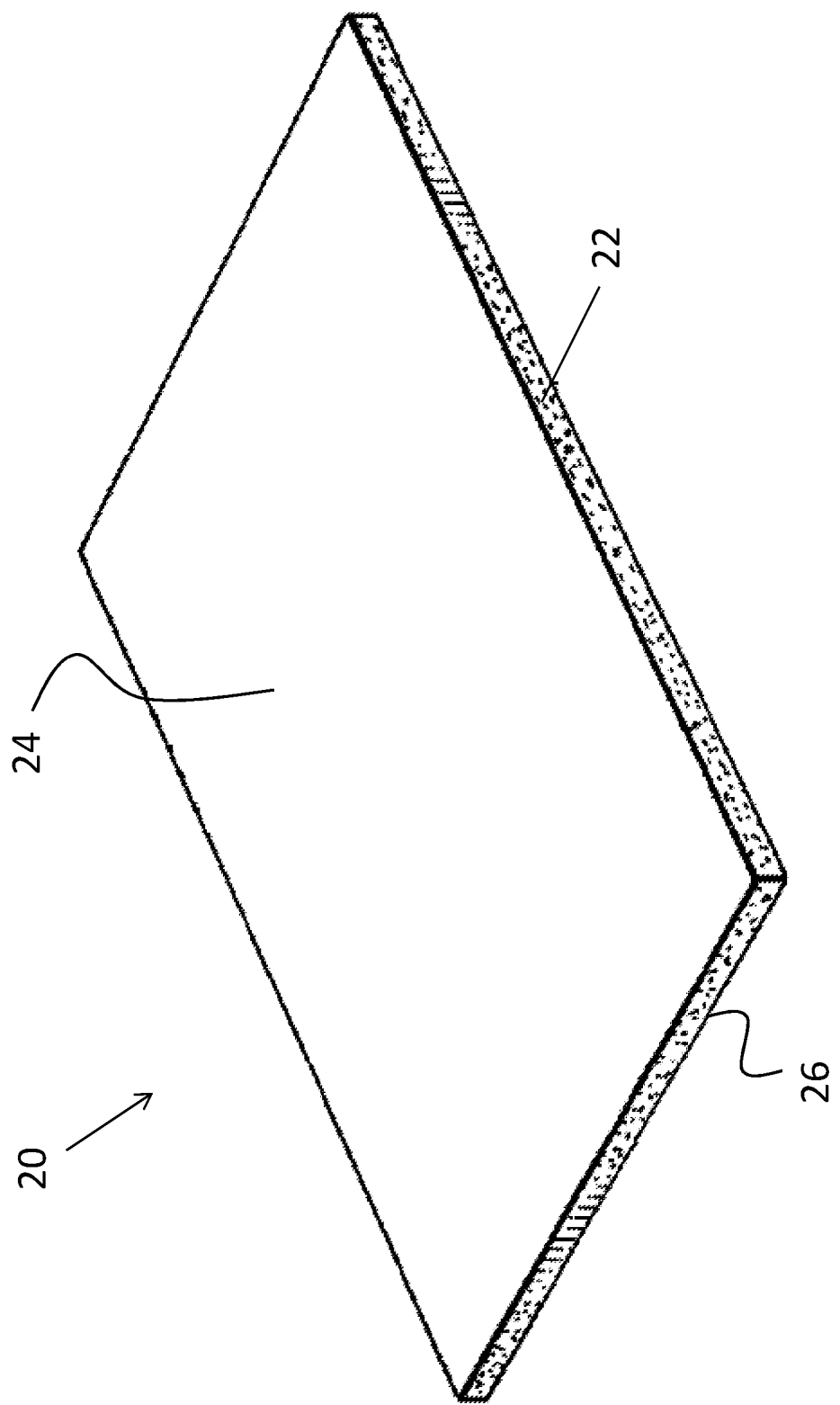
FIG. 1 is a perspective view of a cover board for use in a roofing application according to an embodiment.

Referring now to FIG. 1, a perspective view of an example of a cover board 20 configured for use in building applications is illustrated. The cover board 20 may be used in a variety of applications within a roofing system, such as for overlayment, underlayment, as a separator board, as a vapor barrier substrate, and as a recover board in reroofing applications. Although the cover board 20 is described with reference to a roofing system, it should be understood that the cover board 20 described herein may also be used in other building applications. For example, the cover board 20 may be configured to replace plywood applied to the exterior of a housing frame.

The weight of the cover board 20 is generally between about 1 pound per square foot and about 15 pounds per square foot, such as between 1-10, 1-5, and 1-3 pounds per square foot. The weight of the cover board 20 may vary in part based on the thickness of the cover board 20, and is selected based on the intended application of the cover board 20.

As shown, the cover board 20 includes a core 22 having a first major surface 24 and a second major surface 26 arranged on opposing sides thereof. The first major surface 24 and the second major surface 26 are generally identified as the surfaces of the cover board 20 having the greatest surface area. In the illustrated, non-limiting embodiment, the first and second major surfaces 24, 26 are defined by the length and width of the cover board 20.

The core 22 of the cover board 20 comprises a moisture and mold resistant material. In an embodiment, the composite material is formed entirely from recycled materials, such as beverage cartons and cups, and freezer food cartons (i.e. ice cream cartons) for example. In an embodiment, the recycled materials are shredded and then heated and compressed within a fixture to form the core 22. As the recycled, plastic coated material is heated and compressed, the plastic therein melts and acts a binder for the non-meltable materials, such as cardboard or heavy paper for example. In an embodiment, the non-meltable materials are encapsulated with the plastic, such as a low density polyethylene. Accordingly, the core 22 is formed without the use of water, adhesive, formaldehyde glues, or other hazardous chemicals. As a result, the cover board 20 is free from volatile organic compounds. In some embodiments, the cover board 20 is one or more of air impermeable, water resistant, and fire resistant.

Figure 2:
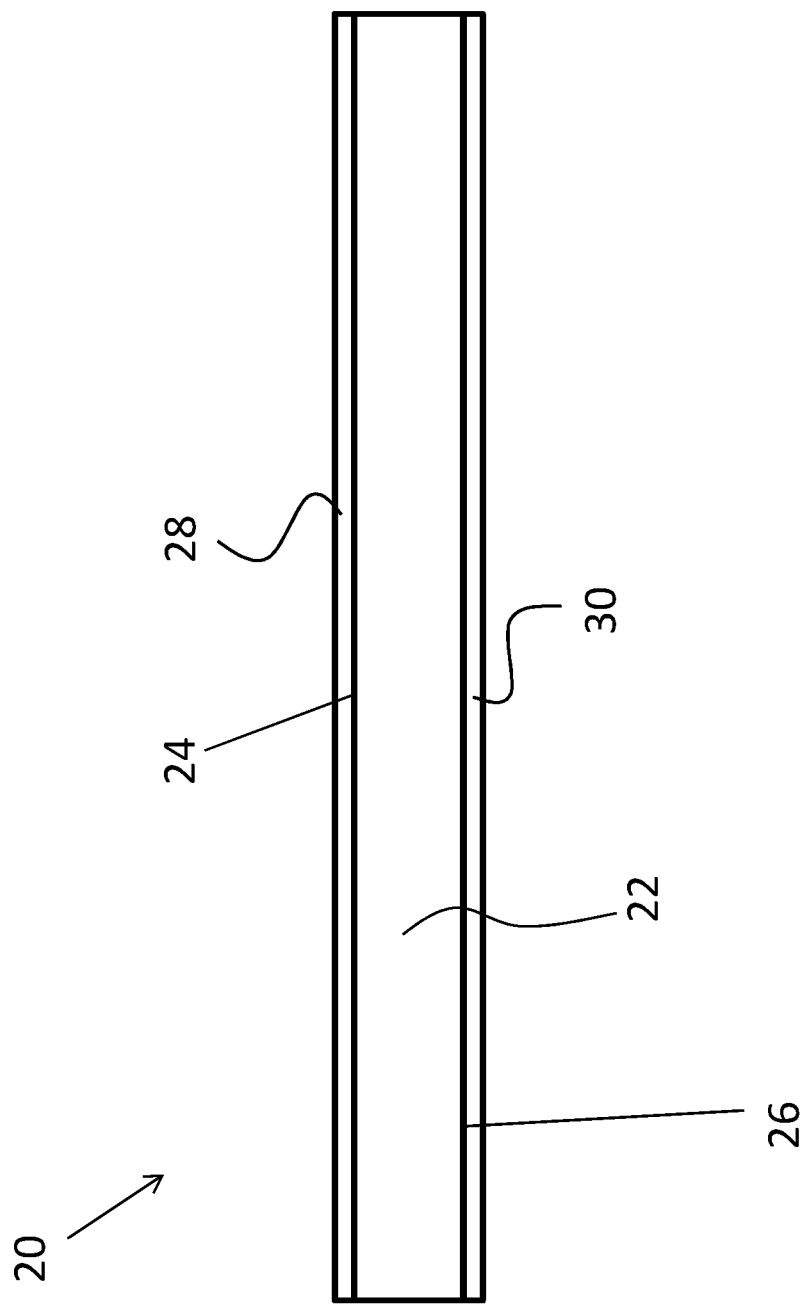
FIG. 2 is a cross-sectional view of a cover board including a facing layer according to an embodiment.

With reference now to cross-sectional view shown in FIG. 2, the cover board 20 may additionally include a first facing layer 28 and/or a second facing layer 30 in an overlapping arrangement with the first and second major surfaces 24, 26, respectively. Inclusion of the facing layers 28, 30 is intended to provide surface strength to the core 22 of the cover board 20. The facing layers 28, 30 may be configured to overlap the entirety, or only a portion, of a corresponding major surface 24, 26. However, it should be understood that in some embodiments, the facing layers 28, 30 may extend over additional surfaces of the cover board 20 besides the major surfaces 24, 26 are also within the scope of the disclosure.

The first and second facing layers 28, 30 may be any sheet material suitable for use with the cover board 20, such as paper or a woven material for example. Examples of suitable materials for the facing layers 28, 30 include, but are not limited to a Kraft paper material of any color, a fiberglass material, a foil material, a cellophane material, or any combination thereof. In embodiments where the cover board 20 includes both a first facing layer 28 and a second facing layer 30, the first and second facing layers 28, 30 may, but need not be, formed from the same material or overlie the same portion of the cover board 20. Each of the materials selectable for use in the facing layer 28, 30 may provide additional benefits to the assembly. For example, because fiberglass material is less susceptible to failure in shear than other materials used in roofing systems, the overall strength of a cover board 20 having at least one facing layer 28, 30 formed from a fiberglass material is enhanced. In addition, a fiberglass facing layer 28, 30 will augment the fire resistant properties of the cover board 20. Fire coating materials, such as silicone for example, are therefore more effective at adhering to the cover board 20 having a fiberglass facing layer 28, 30 than a cover board 20 without such a material. A facing layer 28, 30 including a foil material acts as a radiant barrier, which can reduce the heat loss of a building through its roof.

Figure 4:
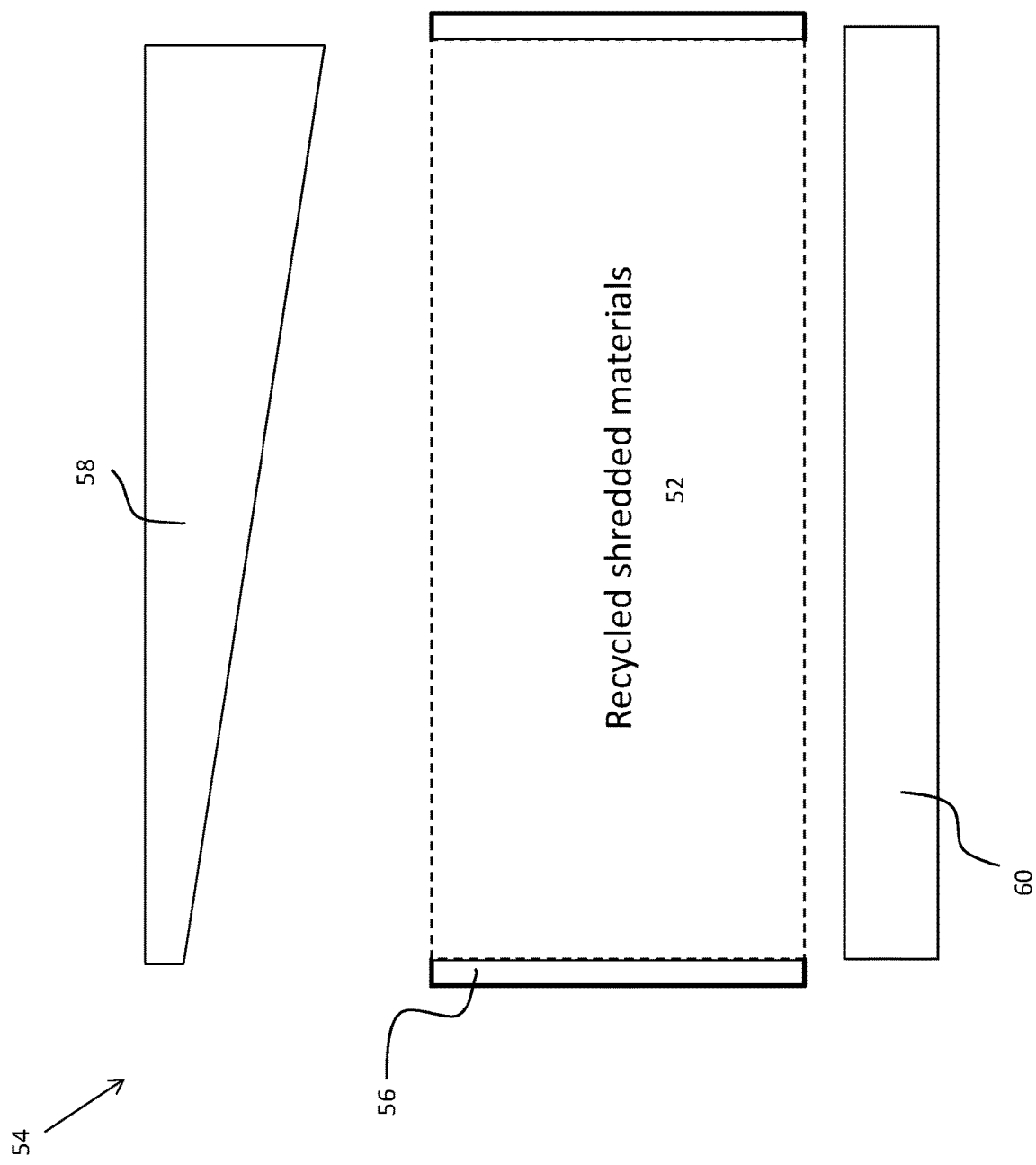
FIG. 4 is a schematic diagram of a fixture for forming a tapered shingle according to an embodiment.

With reference now to FIGS. 3-5, in an embodiment, each piece of cover board 20 may be formed into the shape of one or more shingles 40 usable in a residential or commercial roofing or siding application. In the non-limiting embodiment illustrated in FIG. 1, the cover board 20, and therefore the at least one shingle 40 formed therefrom is generally rectangular in shape. However, it should be understood that a cover board 20 having any shape is within the scope of the disclosure. For example, with reference now to FIG. 3, in an embodiment, the cover board 20 may form a shingle 40 having a wedge of tapered shaped. Accordingly, a thickness at a first end 42 of the shingle 40 is less than a thickness at a second, opposite end 44 of the shingle 40. In an embodiment, the thickness at the first end is approximately ¼" and the thickness at the second end 44 is approximately ¾". In another embodiment, the thickness at the first end is approximately ⅛" and the thickness at the second end 44 is approximately ½". However, a shingle having any dimensions suitable to form a tapered shape is contemplated herein. Further, the thickness of the shingle 40 may be constant or uniform across a width of the shingle, indicated in the FIGS. by arrow W.

The tapered shingles may be mounted to a surface, such as a roof or side of building, illustrated schematically at 50, by affixing the shingles 40, such as with a fastener or adhesive (not shown), in an overlapping configuration. As shown, the second end 44 of the shingles 40, which has the greater thickness, are positioned to overlap the upper end 42 of an adjacent shingle 40. In an embodiment, about 1/10 to ⅓ of the shingle 40 including the second end 44 overlaps the first end 42 of an adjacent shingle.

In an embodiment, the tapered shingles 40 may be formed by heating and compressing shredded recycled, illustrated schematically at 52 materials within a fixture 54. As shown in FIG. 4, the recycled, plastic coated material 52 is arranged within a central portion 56 of the fixture 54. In the illustrated, non-limiting embodiment, the shredded recycled material 52 is distributed such that total a thickness of the material 52 within the central portion 56 is uniform, the thickness being sufficient to achieve the desired dimensions when heated and compressed. A first heated press 58 and a second heated press 60 disposed at opposite sides of the central portion 56 of the fixture 54 are movable into contact with the shredded recycled material 52. As the first and second heated press 58, 60 contact and apply a pressure to the shredded recycled material 52, the material 52 at least partially melts and compresses to form a solid body having a desired shape. In an embodiment, one of the presses, such as the first heated press 58 for example, is angled to form a cover board 20 having a desired tapered contour. The cover board 20 output from the fixture 54 may then be cut at intervals over either a length or width of the cover board 20 to form a plurality of shingles 40 having a desired size.

In another embodiment illustrated in FIG. 5A, the cover board 20 may be in the form a shiplap shingle 40. In such embodiments, a cross-section of the shingle 40 is generally rectangular in shape. A first cutout 62 may be formed at a first end of the shingle 40 and a second cutout 64 may be formed at a second, opposite end of the shingle. In an embodiment, a length of at least one of the first cutout and the second cutout 64 is between 1/24-1/10 of a total length of the shingle 40. Further, the cross-sectional configuration of the shingle 40 may be constant or uniform across a width of the shingle, as indicated in the FIGS. by arrow W.

In an embodiment, the first end 42 of the shingle 40 may be generally complementary to the second cutout 64 and the second end 44 of the shingle 40 may be generally complementary to the first cutout 62. Accordingly, as best shown in FIG. 5B, a plurality of shiplap shingles may be stacked generally adjacent one another relative to a roofing or building surface. When stacked, the first end 42 of a first shingle 40 is received within the second cutout 64 formed in an adjacent shingle 40. Similarly, the second end 44 of the first shingle 40 may be received within the first cutout 62 of another adjacent shingle 40, distinct from the shingle 40 adjacent the first end 42.

With reference now to FIG. 6, in yet another embodiment, the cover board 20 may be formed into shingles 40 suitable for use in batten-type system. The shingles 40 may be oriented horizontally as shown, vertically, or in any other suitable orientation. In such embodiments, the shingles 40 are generally rectangular or square in shape and have a uniform cross-section over the width of the shingle 40. In an embodiment, the joint or intersection formed between adjacent shingles 40 may substantially overlap with a joist or other support member, illustrated at 70. Further, a batten 72, such as also formed from the cover board 20 for example, overlies the gap between adjacent shingles 40. As shown, a dimension of the batten 72, such as a width thereof for example, is shorter than a width of the adjacent shingles 40. However, embodiments where a shingle 40 is used as the batten 72 are also contemplated herein. The batten 72 may be affixed to the adjacent shingles 40 and/or the joist 70 with one or more fasteners 74. An adhesive or silicone material (not shown) may also be positioned within the joint formed between adjacent shingles 40 to seal the interface between the shingles 40 and the joist 70.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A building system, comprising:
a plurality of shingles mounted adjacent one another relative to a building surface, wherein each of the plurality of shingles has a core formed from a compressed composite material, the composite material including a non-meltable material encapsulated by a plastic material, the non-meltable material including cardboard, wherein each of the plurality of shingles includes a first end having a first thickness and a second end having a second thickness.

2. The building system of claim 1, wherein the plurality of shingles are mounted to the building surface in an overlapping arrangement.

3. The building system of claim 2, wherein the plurality of shingles includes a first shingle and a second shingle arranged adjacent the first shingle, wherein between 1/10 and 1/3 of a length of the first shingle overlaps the adjacent second shingle.

4. The building system of claim 1, wherein the first thickness is less than the second thickness such that each of the plurality of shingles is tapered.

5. The building system of claim 1, wherein the plurality of shingles are substantially identical.

6. The building system of claim 1, wherein a first cutout is formed at the first end and a second cutout is formed at the second end.

7. The building system of claim 6, wherein the plurality of shingles includes a first shingle and a second shingle, and the first end of the second shingle is receivable within the second cutout formed at the second end of the first shingle.

8. The building system of claim 7, wherein the first end of the second shingle is generally complementary to the second cutout formed at the second end of the first shingle.

9. The building system of claim 7, wherein the plurality of shingles further includes a third shingle arranged adjacent the second shingle, the second end of the second shingle being receivable within the first cutout formed at the first end of the third shingle.

10. The building system of claim 9, wherein the second end of the second shingle is generally complementary to the first cutout formed at the first end of the third shingle.

11. The building system of claim 1, wherein each of the plurality of shingles has a shiplap configuration.

12. The building system of claim 1, wherein each of the plurality of shingles is generally rectangular in shape.

13. The building system of claim 12, further comprising a plurality of battens, each of the plurality of battens being fastened to the plurality of shingles at an interface formed between adjacent shingles of the plurality of shingles.

14. The building system of claim 13, wherein each of the plurality of battens is formed from a compressed, shredded composite material.

15. The building system of claim 13, wherein further comprising an adhesive arranged within the interface formed between adjacent shingles of the plurality of shingles.

16. The building system of claim 1, wherein each of the plurality of shingles includes at least one facing layer.

17. The building system of claim 16, wherein the at least one facing layer includes one of a foil, fiberglass, Kraft paper, and cellophane.

18. The building system of claim 16 wherein the at least one facing layer provides a radiant barrier.

19. The building system of claim 1, wherein the composite material is recycled material.

20. The building system of claim 19, wherein the recycled material includes low density polyethylene.

21. The building system of claim 1, wherein the core has a weight between 1 pound/square foot and 25 pounds/square foot.

* * * * *